United States Patent
Crupnicoff et al.

(10) Patent No.: US 11,494,189 B2
(45) Date of Patent: Nov. 8, 2022

(54) METHODS AND SYSTEMS FOR PROCESSING DATA IN A PROGRAMMABLE DATA PROCESSING PIPELINE THAT INCLUDES OUT-OF-PIPELINE PROCESSING

(71) Applicant: Pensando Systems Inc., Milpitas, CA (US)

(72) Inventors: Diego Crupnicoff, Buenos Aires (AR); Michael B. Galles, Los Altos, CA (US)

(73) Assignee: Pensando Systems Inc., Milpitas, CA (US)

( * ) Notice: Subject to any disclaimer, the term of this patent is extended or adjusted under 35 U.S.C. 154(b) by 345 days.

(21) Appl. No.: 16/797,854

(22) Filed: Feb. 21, 2020

(65) Prior Publication Data

US 2021/0263744 A1    Aug. 26, 2021

(51) Int. Cl.
*G06F 9/38*  (2018.01)
*G06F 9/30*  (2018.01)

(52) U.S. Cl.
CPC ........ *G06F 9/3836* (2013.01); *G06F 9/30036* (2013.01); *G06F 9/382* (2013.01); *G06F 9/3867* (2013.01)

(58) Field of Classification Search
USPC .......................................................... 370/389
See application file for complete search history.

(56) References Cited

U.S. PATENT DOCUMENTS

| | | | |
|---|---|---|---|
| 10,164,829 B1 * | 12/2018 | Watson ................. | G06F 13/385 |
| 10,313,495 B1 | 6/2019 | Bosshart et al. | |
| 10,721,167 B1 * | 7/2020 | Bosshart ............... | H04L 49/103 |
| 2001/0014941 A1 | 8/2001 | Akkary et al. | |
| 2004/0136241 A1 | 7/2004 | Rapp et al. | |
| 2014/0244966 A1 | 8/2014 | Bosshart et al. | |
| 2017/0093707 A1 | 3/2017 | Kim et al. | |
| 2018/0288198 A1 | 10/2018 | Pope et al. | |
| 2019/0089641 A1 | 3/2019 | Shattah et al. | |
| 2019/0089679 A1 | 3/2019 | Kahalon et al. | |
| 2019/0140979 A1 | 5/2019 | Levi et al. | |
| 2019/0238665 A1 | 8/2019 | Bosshart et al. | |
| 2019/0280976 A1 * | 9/2019 | Wang ..................... | H04L 45/48 |
| 2019/0327323 A1 | 10/2019 | Daly et al. | |
| 2019/0384580 A1 | 12/2019 | Martini et al. | |
| 2020/0021490 A1 | 1/2020 | Schrimpsher et al. | |
| 2020/0313999 A1 * | 10/2020 | Lee ......................... | H04L 69/22 |
| 2022/0166666 A1 * | 5/2022 | Jain ...................... | H04L 41/0806 |

(Continued)

OTHER PUBLICATIONS

"P4 Language Specification, version 1.2.0", published on Oct. 23, 2019 (Year: 2019).*

(Continued)

*Primary Examiner* — Gregory B Sefcheck
*Assistant Examiner* — Majid Esmaeilian
(74) *Attorney, Agent, or Firm* — Loza & Loza, LLP

(57) ABSTRACT

Methods and system for processing data in a programmable processing pipeline are disclosed. In an embodiment, a method for processing packets in a programmable packet processing pipeline is disclosed. The method involves processing data corresponding to a packet through a match-action pipeline of a programmable packet processing pipeline, and diverting the processing of data corresponding to the packet from the match-action pipeline to a processor core for out-of-pipeline processing.

21 Claims, 13 Drawing Sheets

(56) References Cited

U.S. PATENT DOCUMENTS

| | | | |
|---|---|---|---|
| 2022/0206957 A1* | 6/2022 | Nagulapalli | G06F 15/17331 |
| 2022/0210224 A1* | 6/2022 | Kotha | H04L 67/1097 |

OTHER PUBLICATIONS

Budiu et al. "The p416 programming language." ACM SIGOPS Operating Systems Review 51.1 (2017): 5-14. Sep. 2017, Retrieved on Apr. 12, 2021 from <http://budiu.info/work/p4-osr17.pdf>, 9 pgs.

Chole et al. "drmt: Disaggregated programmable switching." Proceedings of the Conference of 1-5, 7-24, the ACM Special Interest Group on Data Communication. 2017. Aug. 25, 2017, Retrieved on Apr. 12, 2021 from <https://dl.acm.org/doi/10.1145/3098822.3098823>, 14 pgs.

Joshi "Data Processing Pipeline Patterns." Informatica Corporation. Aug. 20, 2019 1-24, Retrieved on Apr. 12, 2021 from <https://blogs.informatica.com/2019/08/20/data-processing-pipeline-patterns/>, 5 pgs.

Kaufmann et al. "High performance packet processing with flexnic." Proceedings of the Twenty-First International Conference on Architectural Support for Programming Languages and Operating Systems. 2016. Apr. 6, 2016, Retrieved on Apr. 12, 2021 from <https://dl.acm.org/doi/10.1145/2980024.2872367>, 14 pgs.

International Search Report and Written Opinion, PCT/US2021/018621, dated May 6, 2021, 9 pgs.

Arista, "Arista 7170 Multi-function Programmable Networking", White Paper, 15 pgs. (Nov. 29, 2018).

Bilfulco, Roberto et al. "A Survey on the Programmable Data Plane: Abstractions, Architectures, and Open Problems", IEEE, 7 pgs. (2018).

Bosshart, Pat et al. "Forwarding Metamorphosis: Fast Programmable Match-Action Processing in Hardware for SDN", SIGCOMM'13, 12 pgs. (Aug. 12-13, 2013).

Bosshart, Pat et al. "P4: Programming Protocol-Independent Packet Processors", ACM SIGCOMM, vol. 44, No. 3, 8 pgs. (Jul. 2014).

Choi, Sean et al. "λ-NIC: Interactive Serverless Compute on Programmable SmartNICs", 15 pgs. (2019).

Eran, Haggai et al. "NICA: An Infrastructure for Inline Acceleration of Network Applications", 18 pgs. (2019).

Banez, Stephen et al. "The P4→NetFPGAWorkflow for Line-Rate Packet Processing", 9 pgs. (Feb. 27, 2019).

Kaljic, Enio et al. "A Survey on Data Plane Flexibility and Programmability in Software-Defined Networking", IEEE, vol. X, 38 pgs (2019).

Mellanox Technologies "Bluefield-2 Smat NIC for Ethernet, High Performance Smart Network Controller Card", SmartNIC Product Brief, 3 pgs (2019).

Mellanox Technologies "Bluefield-2 Smat NIC for Ethernet, High Performance Ethernet Network Adapter Cards", SmartNIC Product Brief, 3 pgs. (2019).

Miano, Sebastiano et al. "Introducing SmartNICs in Server-Based Data Plane Processing: The DDoS Mitigation Use Case", IEEE Acess, vol. 7, 10 pgs. (2019).

Netcope Technologies "Building a NIC with Netcope P4", Whitepaper, 4 pgs. (2019).

Netcope Technologies "Netcope P4 for Intel PAC N3000", 22 pgs., (2019).

Netronome "Agilio® CX 50GbE SmartNIC for OCP", 2 pgs. (2019).

Netronome "Netronome NFP-4000 Flow Processor", 3 pgs. (2018).

Ni, Zhen et al. "Advancing Network Function Virtualization Platforms with Programmable NICs", IEEE, 6 pgs. (2019).

Patra, P. Gyanesh Kumar et al. "Towards Realization of High Performance Programmable Datapaths using Domain Specific Language", 4 pgs. (Nov. 2018).

Peer, Edwin, "Mapping P4 to SmartNICs", Netronome, 19 pgs. (May 16, 2017).

P416 Language Specification, version 1.2.0, The P4 Language Consortium, 154 pgs. (Oct. 23, 2019).

* cited by examiner

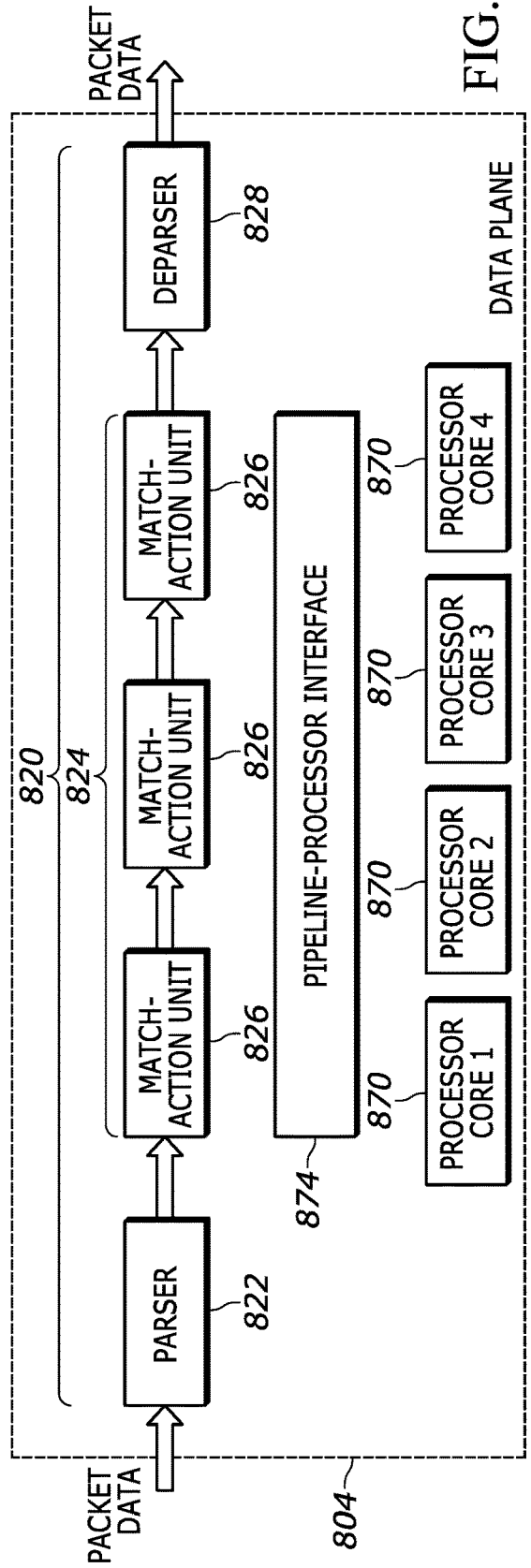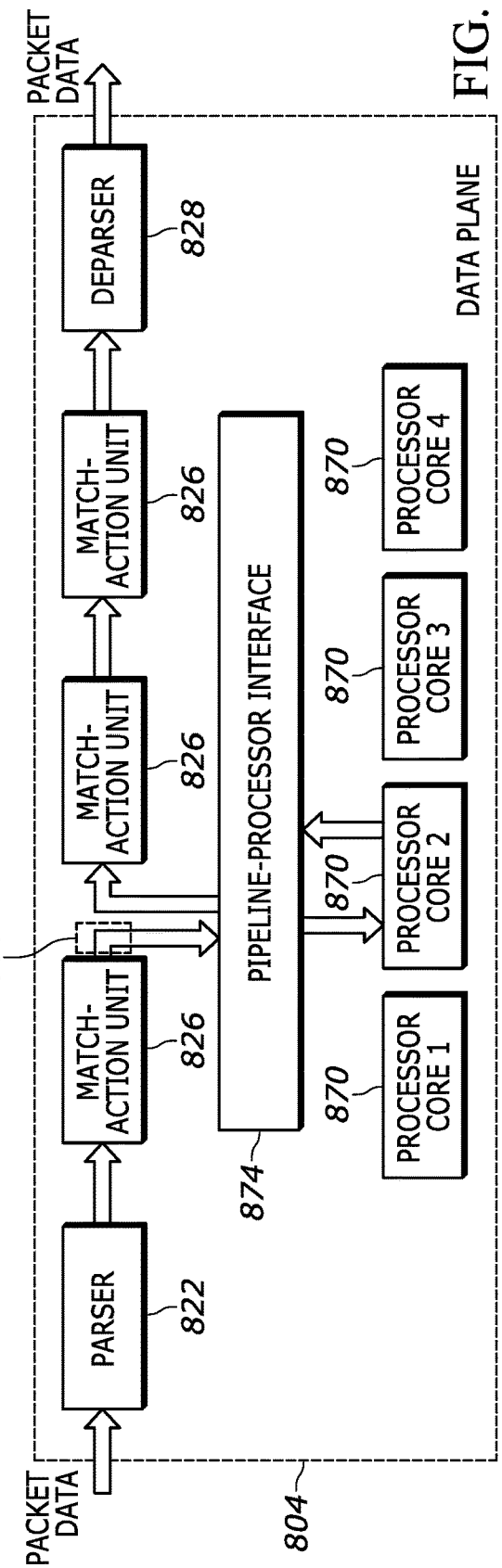

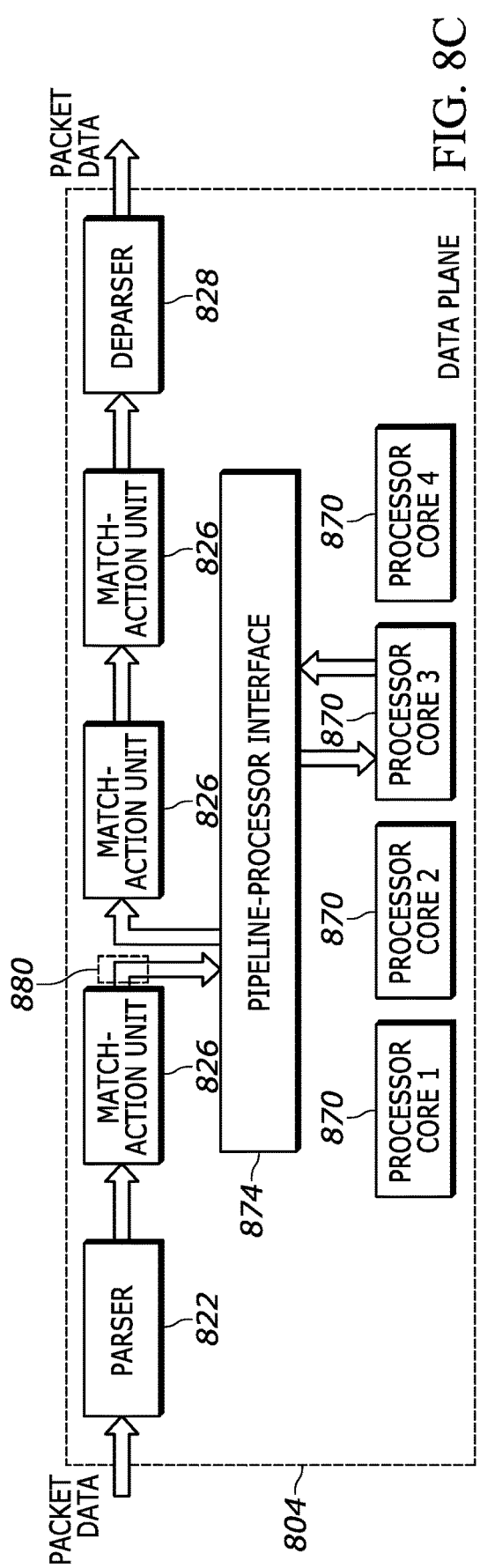
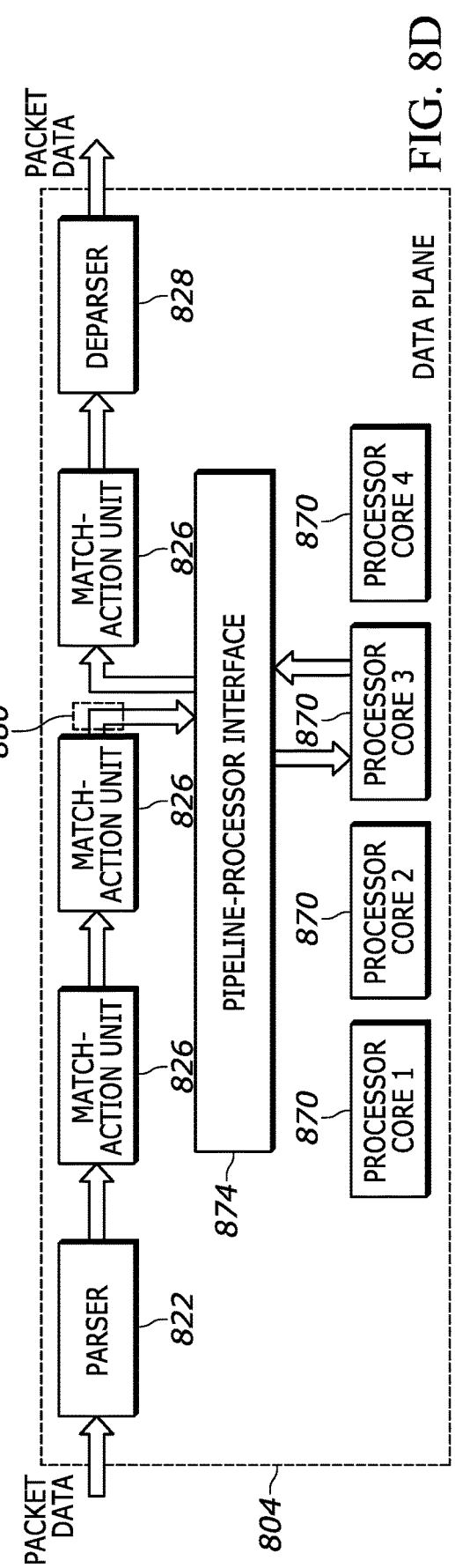

METHODS AND SYSTEMS FOR PROCESSING DATA IN A PROGRAMMABLE DATA PROCESSING PIPELINE THAT INCLUDES OUT-OF-PIPELINE PROCESSING

BACKGROUND

In data networks, input/output (I/O) systems such as switches, routers, and network interface cards receive packets at input interfaces, process the received packets, and then forward the packets to one or more output interfaces. It is important that such I/O systems operate as quickly as possible in order to keep pace with a high rate of incoming packets. One challenge associated with I/O systems relates to providing the flexibility to adapt to changes in desired feature sets, networking protocols, operating systems, applications, and hardware configurations.

SUMMARY

Methods and system for processing data in a programmable processing pipeline are disclosed. In an embodiment, a method for processing packets in a programmable packet processing pipeline is disclosed. The method involves processing data corresponding to a packet through a match-action pipeline of a programmable packet processing pipeline, and diverting the processing of data corresponding to the packet from the match-action pipeline to a processor core for out-of-pipeline processing.

In an embodiment, the method further involves returning a result of the out-of-pipeline processing back to the match-action pipeline for further processing. In an embodiment, returning a result of the out-of-pipeline processing back to the match-action pipeline involves queuing the result for use by a next stage of the match-action pipeline.

In an embodiment, diverting the processing of data corresponding to the packet from the match-action pipeline to a processor core involves reading a field in a packet header vector that is processed in the match-action pipeline and diverting the processing of data corresponding to the packet in response to reading the field in the packet header vector. In an embodiment, diverting the processing of data corresponding to the packet from the match-action pipeline to a processor core involves queuing at least a portion of the packet header vector for use by the processor core.

In an embodiment, diverting the processing of data corresponding to the packet from the match-action pipeline to a processor core comprises providing a packet header vector to the processor core via direct memory access (DMA).

In an embodiment, the method further involves parsing header information corresponding to the packet to generate a packet header vector and providing the packet header vector to the match-action pipeline.

In an embodiment, processing data through a match-action pipeline involves processing a packet header vector that is generated from header information of the packet.

In an embodiment, the programmable packet processing pipeline is programmable according to the P4 language specification as provided by the P4 Language Consortium.

In an embodiment, the method further involves programming the programmable packet processing pipeline according to the P4 language specification as provided by the P4 Language Consortium.

In an embodiment, the method further involves diverting the processing of data corresponding to multiple packets from a flow of packets to maintain packet ordering of the flow of packets. In an embodiment, the multiple packets from the flow of packets are diverted to the same processor core for out-of-pipeline processing. In an embodiment, a flow of packets are packets that have common header values. In an embodiment, a flow of packets consists of packets that have the same source IP address, source port number, destination IP address, destination port number, and protocol.

A system for processing packets is also disclosed. The system includes a programmable packet processing pipeline that includes a match-action pipeline, multiple processor cores, a pipeline-processor interface that connects the programmable packet processing pipeline to the multiple processor cores, and diversion logic configured to divert the processing of data corresponding to a packet from the match-action pipeline to at least one processor core of the multiple processor cores via the pipeline-processor interface for out-of-pipeline processing.

In an embodiment, the pipeline-processor interface is configured to return a result of the out-of-pipeline processing back to the match-action pipeline for further processing.

In an embodiment, the pipeline-processor interface includes memory configured to queue data corresponding to the packet as the processing transitions between the programmable packet processing pipeline and the processor cores.

In an embodiment, the diversion logic is configured to read a value of a packet header vector and to divert the processing from the match-action pipeline to at least one processor core of the multiple processor cores in response to the read value.

In an embodiment, the diversion logic comprises programmable decision logic and select logic, wherein the programmable decision logic is configured to read a value of a packet header vector and to control the select logic to select between available options of a match-action unit of the programmable packet processing pipeline and at least one processor core of the multiple processor cores.

In an embodiment, the programmable packet processing pipeline includes a programmable parser and a programmable deparser, and the match-action pipeline includes a series of programmable match-action units located in a process flow between the programmable parser and the programmable deparser.

In an embodiment, the match-action pipeline includes a series of match-action units and wherein the match-action units of the match-action pipeline include a match unit having key construction logic and a match table.

In an embodiment, the programmable packet processing pipeline is programmable according to the P4 language specification as provided by the P4 Language Consortium.

A method for processing data in a programmable data processing pipeline is also discloses. The method involves processing data corresponding to a data set through a match-action pipeline of a programmable processing pipeline and diverting the processing of data corresponding to the data set from the match-action pipeline to a processor core for out-of-pipeline processing.

In an embodiment, the method further includes returning a result of the out-of-pipeline processing back to the match-action pipeline for further processing.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 8A depicts elements of an I/O system that are configured to implement a hybrid approach to packet processing at the data plane.

FIG. 8B illustrates the processing of data corresponding to a packet being diverted to a processor core.

FIG. 8C illustrates the processing of data corresponding to a packet being diverted to a processor core.

FIG. 8D illustrates the processing of data corresponding to a packet being diverted to a processor core.

Throughout the description, similar reference numbers may be used to identify similar elements.

DETAILED DESCRIPTION

Figure 1:
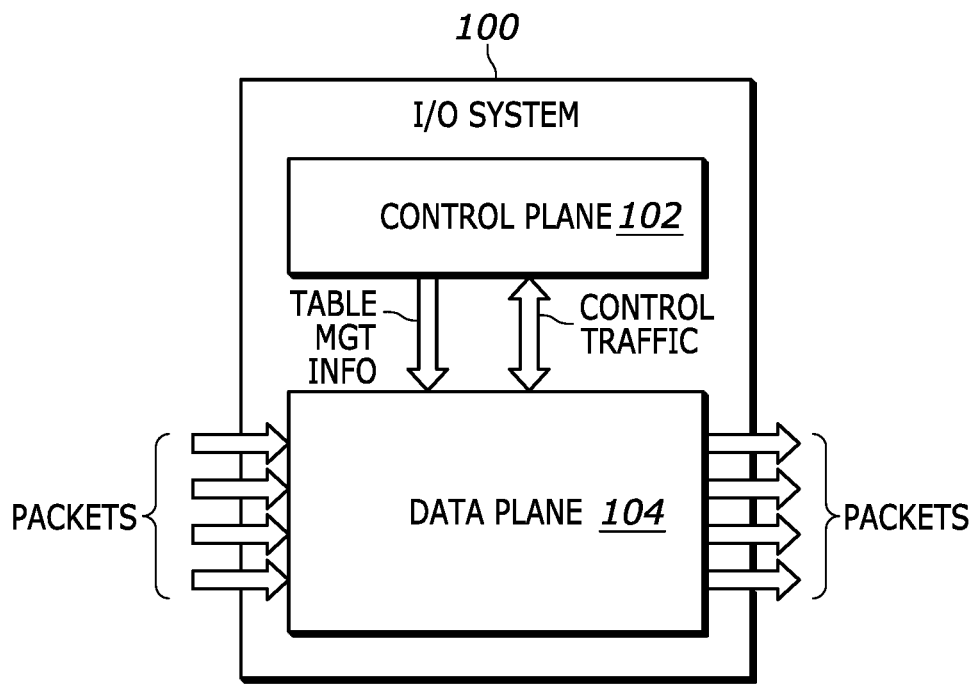
FIG. 1 is a functional block diagram of an I/O system in which a control plane and a data plane are illustrated.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In the field of data networking, the functionality of I/O systems such as switches, routers, and network interface cards (NICs) is often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to forwarding information provided by the control plane. The data plane may also refer to components and/or operations that implement packet processing operations related to encryption, decryption, compression, decompression, firewalling, and telemetry.

FIG. 1 is a functional block diagram of an I/O system 100 in which a control plane 102 and a data plane 104 are illustrated. As illustrated in FIG. 1, the control plane provides forwarding information (e.g., in the form of table management information) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBs) and Label Forwarding Information Bases (LFIBs), while the data plane is responsible for a high volume of time-sensitive forwarding decisions that need to be made at a rapid pace. In some embodiments, the control plane may implement operations related to packet routing that include Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). In some embodiments, the data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

Often times, the high-volume and rapid decision-making that occurs at the data plane is implemented in fixed function application specific integrated circuits (ASICs). Although fixed function ASICs enable high-volume and rapid packet processing, fixed function ASICs typically do not provide enough flexibility to adapt to changing needs. Data plane processing can also be implemented in field programmable gate arrays (FPGAs) to provide a high level of flexibility in data plane processing. Although FPGAs are able to provide a high level of flexibility for data plane processing, FPGAs are relatively expensive to produce and consume much more power than ASICs on a per-packet basis.

Some techniques exist for providing flexibility at the data plane of I/O systems that are used in data networks. For example, the concept of a domain-specific language for programming protocol-independent packet processors, known simply as "P4," has developed as a way to provide some flexibility at the data plane of an I/O system. The P4 domain-specific language for programming the data plane of I/O systems is currently defined in the "$P4_{16}$ Language Specification," version 1.2.0, as published by the P4 Language Consortium on Oct. 23, 2019, which is incorporated by reference herein. P4 (also referred to herein as the "P4 specification," the "P4 language," and the "P4 program") is designed to be implementable on a large variety of targets including programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

Figure 2:
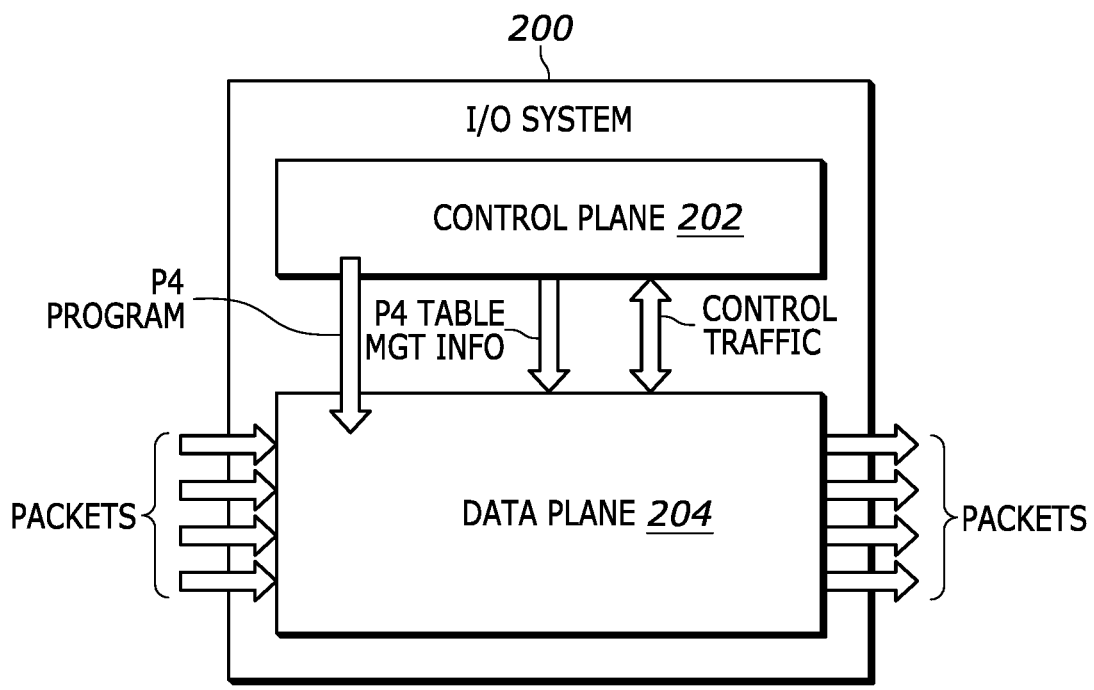
FIG. 2 is a depiction of an I/O system in which the data plane is programmable according to the P4 domain-specific language.

FIG. 2 is a depiction of an I/O system 200 in which the data plane 204 is programmable according to the P4 domain-specific language. As illustrated in FIG. 2, a P4 program is provided to the data plane via the control plane 202. The P4 program includes software code that configures the functionality of the data plane to implement particular processing and/or forwarding logic and processing and/or forwarding tables are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane and the data plane corresponds to a class of algorithms that describe transformations on packets by packet processing systems.

Figure 3:
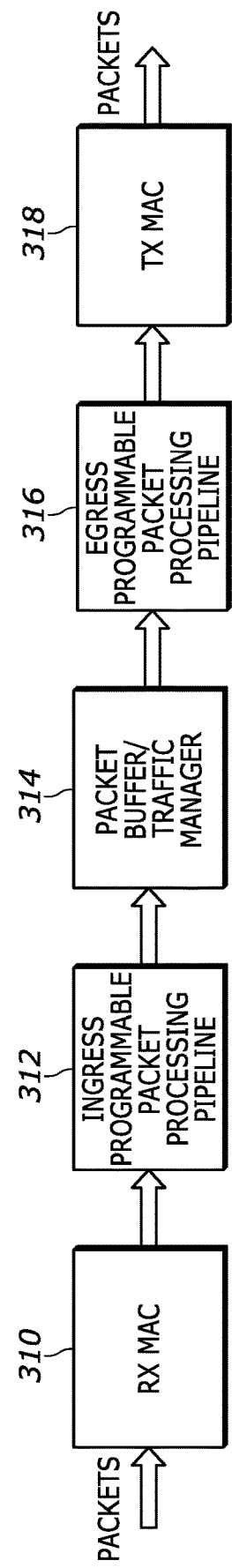
FIG. 3 depicts elements of the data plane of an I/O system in which some elements are programmable according to a domain-specific language.

FIG. 3 depicts elements of the data plane of an I/O system in which some elements are programmable according to a domain-specific language such as P4. The data plane of the I/O system includes a receive media access controller (MAC) (RX MAC) 310, an ingress programmable packet processing pipeline 312, a packet buffer/traffic manager 314, an egress programmable packet processing pipeline 316, and a transmit MAC (TX MAC) 318. The elements described with reference to FIG. 3 may be implemented, for example, as a P4 programmable switch architecture (PSA) or as a P4 programmable NIC, although architectures other than a PSA and a P4 programmable NIC are also possible.

The RX MAC 310 implements media access control on incoming packets via, for example, a MAC protocol such as Ethernet. In an embodiment, the MAC protocol is Ethernet and the RX MAC is configured to implement operations related to, for example, receiving frames, half-duplex retransmission and backoff functions, Frame Check Sequence (FCS), interframe gap enforcement, discarding malformed frames, and removing the preamble, Start Frame Delimiter (SFD), and padding from a packet. Likewise, the TX MAC 318 implements media access control on outgoing packets via, for example, Ethernet. In an embodiment, the TX MAC is configured to implement operations related to, for example, transmitting frames, half-duplex retransmission and backoff functions, appending an FCS, interframe gap enforcement, and prepending a preamble, an SFD, and padding. The packet buffer/traffic manager 314 includes memory and/or logic to implement packet buffering and/or traffic management. In an embodiment, operations implemented via the packet buffer/traffic manager include, for example, packet buffering, packet scheduling, and/or traffic shaping.

The ingress and egress programmable packet processing pipelines 312 and 316 are packet processing pipelines that operate at the data plane of an I/O system and that are programmable via a domain-specific language such as P4. In an embodiment, the ingress and egress programmable packet processing pipelines can be programmed to implement various operations at the data plane such as, for example, routing, bridging, tunneling, forwarding, network access control lists (ACLs), Layer 4 (L4) firewalls, flow-based rate limiting, VLAN tag policies, group membership, isolation, multicast, group control, label push/pop operations, L4 load-balancing, L4 flow tables for analytics and flow specific processing, distributed denial of service (DDoS) attack detection, DDoS attack mitigation, and telemetry data gathering on any packet field or flow state.

Figure 4A:
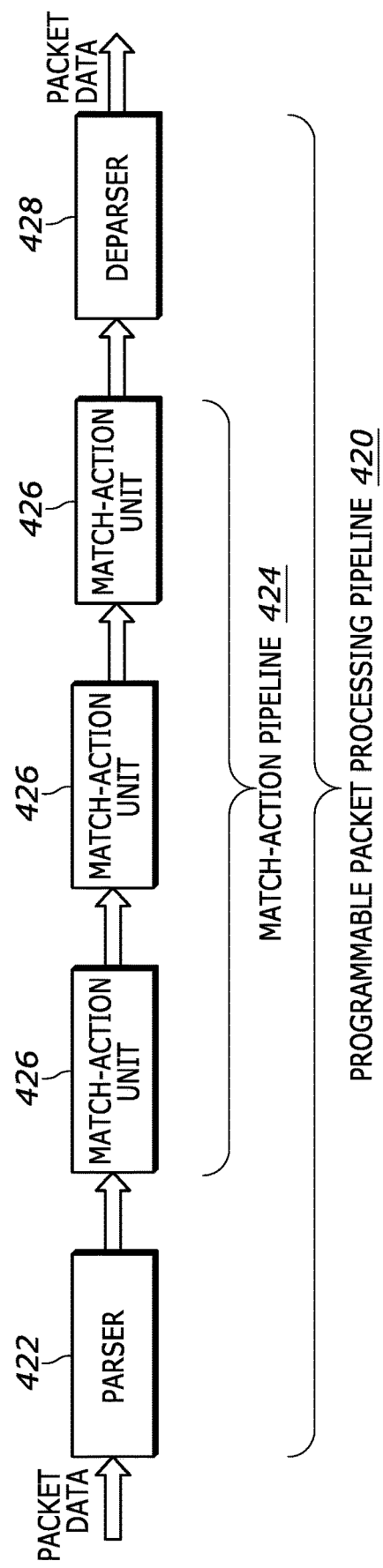
FIG. 4A depicts an expanded view of a programmable packet processing pipeline that can be used to implement the ingress and egress programmable packet processing pipelines shown in FIG. 3.

FIG. 4A depicts an expanded view of a programmable packet processing pipeline 420 that is programmable using a domain-specific language such as P4 and that can be used to implement the ingress and egress programmable packet processing pipelines 312 and 316 shown in FIG. 3 to process packet data. As described in the P4 specification, a programmable packet processing pipeline includes a parser 422, a match-action pipeline 424 having a series of match-action units 426, and a deparser 428. The parser is a programmable element that is configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. In an embodiment, the information extracted from a packet by the parser is referred to as a packet header vector or "PHV." In an embodiment, the parser identifies certain fields of the header and extracts the data corresponding to the identified fields to generate the PHV. In an embodiment, the PHV may include other data (often referred to as "metadata") that is related to the packet but not extracted directly from the header, including for example, the port or interface on which the packet arrived at the I/O system. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The match-action units 426 of the match-action pipeline 424 are programmed to perform "match+action" operations in which a match unit performs a lookup using at least a portion of the PHV and an action unit performs an action based on an output from the match unit. In an embodiment, a PHV generated at the parser is passed through each of the match-action units in the match-action pipeline in series and each match-action unit implements a match+action operation. The PHV and/or table entries may be updated in each stage of match-action processing according to the actions specified by the P4 programming. In some instances, a packet may be recirculated through the match-action pipeline, or a portion thereof, for additional processing.

Figure 4B:
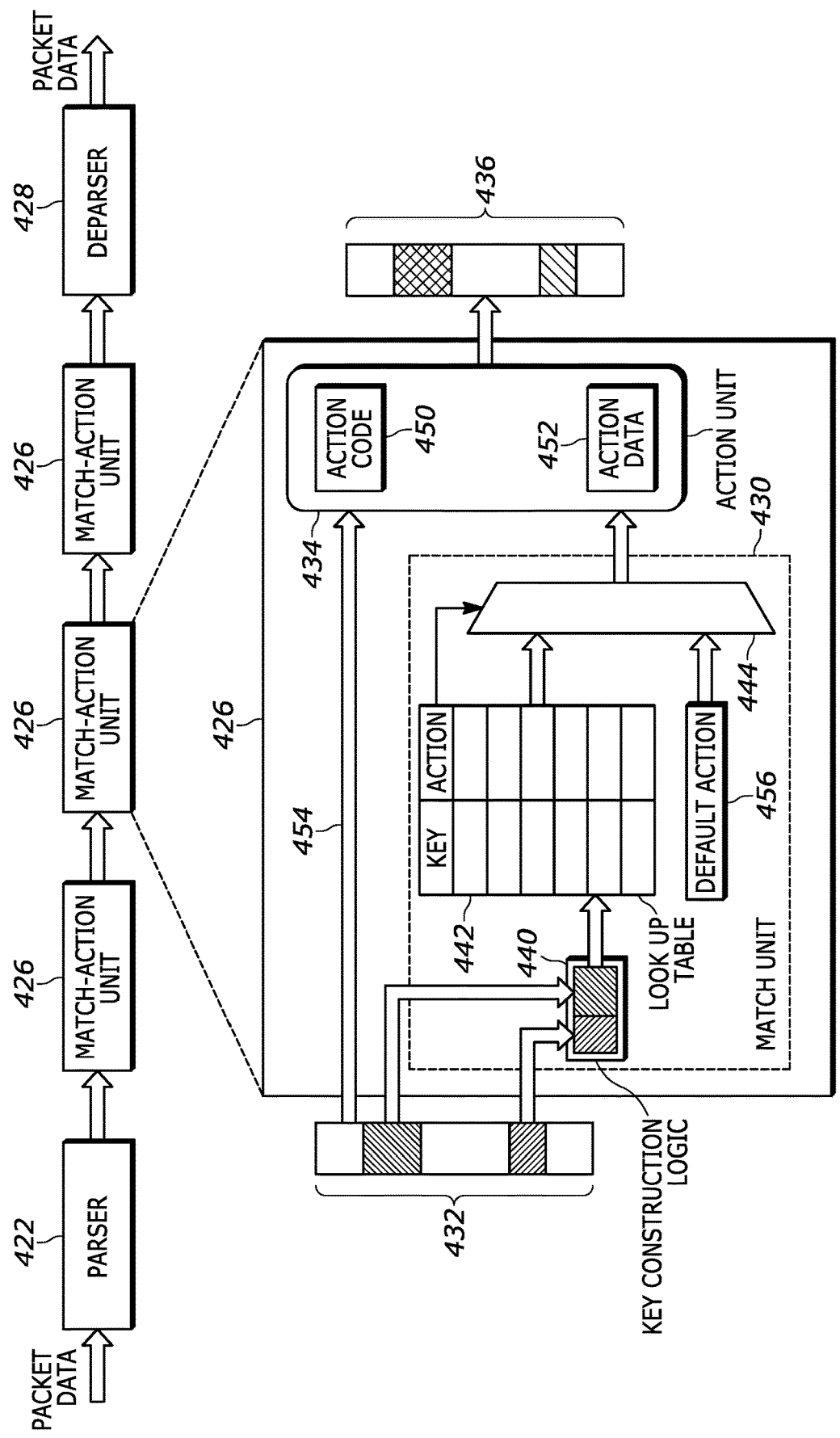
FIG. 4B is an expanded view of elements of a match-action unit from the programmable packet processing pipeline shown in FIG. 4A.

FIG. 4B is an expanded view of elements of a match-action unit 426 from the programmable packet processing pipeline 420 shown in FIG. 4A. As shown in FIG. 4B, the match-action unit includes a match unit 430 (also referred to as a "table engine") that operates on an input PHV 432 and an action unit 434 that produces an output PHV 436, which may be a modified version of the input PHV. The match unit includes key construction logic 440 that is configured to generate a key from at least one field in the PHV, a lookup table 442 that is populated with key-action pairs, where a key-action pair includes a key (e.g., a lookup key) and corresponding action code 450 and/or action data 452, and selector logic 444. In an embodiment, a P4 lookup table generalizes traditional switch tables, and can be programmed to implement, for example, routing tables, flow lookup tables, ACLs, and other user-defined table types, including complex multi-variable tables. The key generation and lookup function constitutes the "match" portion of the operation and produces an action that is provided to the action unit via the selector logic. The action unit executes an action over the input data (which may include data 454 from the PHV) and provides an output that forms at least a portion of the output PHV. For example, the action unit executes action code 450 on action data 452 and data 454 to produce an output that is included in the output PHV. If no match is found in the lookup table, then a default action 456 may be implemented. In an embodiment, operations of the match-action unit are programmable in the control plane via P4 and the contents of the lookup table is managed by the control plane.

Referring back to FIG. 4A, the deparser 428 is a programmable element that is configured through the domain-specific language (e.g., P4) to generate packet headers from PHVs at the output of the last match-action unit 426 in the match-action pipeline 424 and to construct outgoing packets by reassembling the header(s) (e.g., Ethernet and IP headers) as determined by the match-action pipeline. In some cases, a packet payload may travel in a separate first-in-first-out (FIFO) queue until the packet payload is reassembled with its corresponding PHV at the deparser to form a packet. The deparser may rewrite the original packet according to the PHV fields that have been modified (e.g., added, removed, or updated). In some cases, a packet processed by the ingress programmable packet processing pipeline (see FIG. 3, ingress programmable packet processing pipeline 312) may be placed in the packet buffer/traffic manager (see FIG. 3, packet buffer/traffic manager 314) for scheduling and possible replication. In some cases, once a packet is scheduled and leaves the packet buffer/traffic manager, the packet may be parsed again at the egress programmable packet processing pipeline (see FIG. 3, egress programmable packet processing pipeline 316) and processed in the corresponding match-action pipeline to generate an egress PHV. The egress PHV may be passed through the corresponding match-action pipeline as described with reference to FIGS. 4A and 4B, after which a final deparser operation may be executed (e.g., at deparser 428) before the packet is sent to the TX MAC (see FIG. 3, TX MAC 318) or recirculated for additional processing.

As described with reference to FIGS. 2-4B, an I/O system can be programmed with a domain-specific language such as P4 to provide flexibility in a packet processing pipeline at the data plane. Although a domain-specific language such as P4 can provide flexibility to a packet processing pipeline at the data plane, the flexibility that can be provided at the data plane through the domain-specific language may still be limited to the operations specified in the domain-specific language. For example, the operations that can be implemented at the data plane using P4 are limited by the available features of the P4 specification. However, in some cases it may be desirable to provide fast path performance levels for the processing of certain packets even though the packets are not well-suited for processing in a P4 programmable packet processing pipeline.

In accordance with an embodiment of the invention, a technique for processing packets involves processing data corresponding to a packet (e.g., a PHV) through a match-action pipeline of a programmable packet processing pipeline such as a P4 programmable packet processing pipeline and diverting the processing of data corresponding to the packet from the match-action pipeline to a processor core (e.g., a general purpose processor core such as an Advanced RISC Machines (ARM) processor core), for out-of-pipeline processing. The out-of-pipeline processing may implement operations on packet data such as Layer 7 (L7) applications (e.g., HTTP load balancing, L7 firewalling, and/or L7 telemetry), flow table insertion or table management events, connection setup/management, multicast group join, deep packet inspection (DPI) (e.g., universal resource locator (URL) inspection), storage volume management (e.g., non-volatile memory express (NVMe) volume setup and/or management), encryption, decryption, compression, and, decompression, which may not be readily implementable in the match-action pipeline but can be integrated into the process flow of the match-action pipeline in a manner that enables such packet processing to be implemented using a general purpose processor core to provide packet processing at or near fast path performance levels. For example, out-of-pipeline processing may implement packet processing operations on high volume and/or time-sensitive packets that cannot be implemented in, or are not well suited for, a P4 programmable packet processing pipeline such as Layer 7 (L7) applications (e.g., HTTP load balancing, L7 firewalling, and/or L7 telemetry), flow table insertion or table management events, connection setup/management, multicast group join, URL inspection, storage volume management (e.g., NVMe volume setup and/or management), encryption, decryption, compression, and, decompression. In an embodiment, the out-of-pipeline processing may also include operations that are traditionally implemented at the control plane. In an embodiment, the result of the out-of-pipeline processing is returned back to the match-action pipeline for further processing such that the out-of-pipeline processing is seamlessly integrated into the process flow of the match-action pipeline. The techniques described herein utilize both the match-action units of a programmable packet processing pipeline such as a P4 programmable packet processing pipeline and at least one highly flexible processor core, such as an ARM processor core, in a hybrid approach to processing packets through a programmable packet processing pipeline. Such a hybrid approach to packet processing provides additional flexibility to the range of operations that can be implemented on packet data without sacrificing the fast path performance that is expected of data plane processing.

In an embodiment, diverting the processing of data corresponding to a packet from the match-action pipeline of a programmable packet processing pipeline (e.g., a P4 programmable packet processing pipeline) to a processor core involves queuing the latest PHV of the packet for processing by the processor core. In one embodiment, the PHV is placed in a queue that is specific to a particular processor core and in another embodiment, the PHV is provided to a shared memory L2 cache that is available to the processor core. In another embodiment, the PHV is provided to the processor core using direct memory access (DMA). In an embodiment, diversion logic is integrated into a programmable packet processing pipeline and configured to determine whether or not to divert the processing of a packet from the match-action pipeline to a processor core for out-of-pipeline processing. In an embodiment, the decision of the diversion logic for a particular packet is based on a value of a field in the PHV corresponding to the packet, where the value of the field was determined by a previous stage in the match-action pipeline.

In an embodiment, an I/O system includes a programmable packet processing pipeline having a match-action pipeline (e.g., a P4 programmable packet processing pipeline), multiple processor cores, a pipeline-processor interface, and diversion logic. The programmable packet processing pipeline and the processor cores are connected to each other by the pipeline-processor interface and the diversion logic is configured to divert the processing of data corresponding to a packet from the match-action pipeline to a processor core via the pipeline-processor interface for out-of-pipeline processing. The pipeline-processor interface may include memory and logic circuits that enable data corresponding to a packet (e.g., the PHV) to be queued before the out-of-pipeline processing and after the out-of-pipeline processing but before data corresponding to the packet (e.g., an updated PHV) is returned to the match-action pipeline for further processing.

Figure 5A:
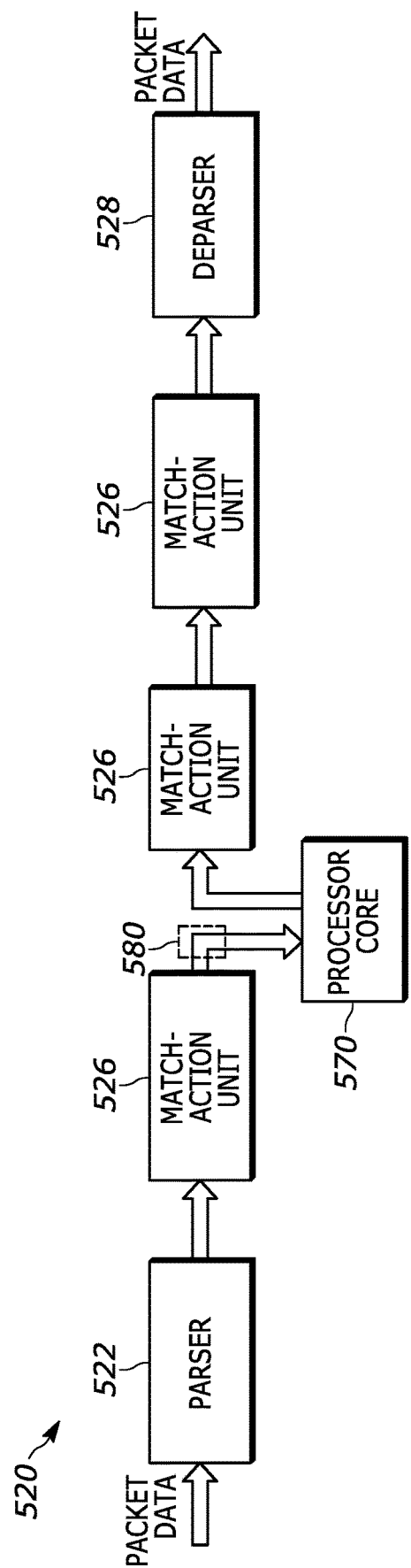
FIG. 5A depicts a programmable packet processing pipeline similar to the programmable packet processing pipeline described with reference to FIGS. 4A and 4B that illustrates the processing of data corresponding to a packet being diverted from the match-action pipeline to a processor core for out-of-pipeline processing.

FIG. 5A depicts a programmable packet processing pipeline 520 similar to the programmable packet processing pipeline 420 described with reference to FIGS. 4A and 4B (e.g., a P4 programmable packet processing pipeline) that illustrates the processing of data corresponding to a packet being diverted from the match-action pipeline to a processor core 570 for out-of-pipeline processing. For example, data corresponding to the packet is diverted from the match-action pipeline by diversion logic 580 to implement packet processing operations such as L7 applications (e.g., HTTP load balancing, L7 firewalling, and/or L7 telemetry), flow table insertion or table management events, connection setup/management, multicast group join, URL inspection, and storage volume management (e.g., NVMe volume setup and/or management), encryption, decryption, compression, decompression, which may not be readily implementable in the match-action pipeline but can be integrated into the process flow of the match-action pipeline in a manner that enables such packet processing to be implemented using a general purpose processor core to provide fast path performance as is expected of data plane processing and that does not involve sending the packet to the control plane for control plane processing. Once the desired out-of-pipeline processing is completed, data corresponding to the packet (e.g., an updated PHV) is returned to the match-action pipeline for further processing. For example, data corresponding to the packet (e.g., an updated PHV) is returned to a queue that feeds the next match-action unit in the match-action pipeline. As used herein, "out-of-pipeline processing" may refer to processing of data corresponding to a packet (e.g., including a PHV, header data, metadata, and/or payload data corresponding to the packet) that is not implemented by the parser, the deparser, or a match-action unit of a programmable packet processing pipeline, e.g., a programmable packet processing pipeline that was programmed using P4. In an embodiment, out-of-pipeline processing involves operations that are executed by a general purpose processor core such as an ARM processor core that is programmed using a general purpose programming language such as C. In an embodiment, out-of-pipeline processing by a processor core involves implementing a discrete packet processing operation (e.g., L7 applications (e.g., HTTP load balancing, L7 firewalling, and/or L7 telemetry), flow table insertion or table management events, TCP connection setup/management, multicast group join, HTTP URL inspection, storage volume management, and Internet control message protocol (ICMP)) at or near fast path performance levels through execution of a relatively small number of instructions with no context switching as opposed to executing such a discrete packet processing operation at the control plane, which may involve execution of thousands of instructions and context switching, which is typically much slower than the operations that are performed in the programmable packet processing pipeline. Operations that may be implemented by a processor core during out-of-pipeline processing may include packet processing operations that are not well suited for a P4 programmable packet processing pipeline, but that can improve the user experience if processed at fast path performance levels, including, for example, DPI (e.g., HTTP URL inspection), connection setup/management (e.g., TCP connection setup/management), multicast group join, storage volume management, and ICMP. Although some operations that may be implemented by the processor core during out-of-pipeline processing are described, other operations are possible and data corresponding to a packet that is processed during out-of-pipeline processing may include a PHV, the packet header (or a portion thereof), and/or the packet payload.

Figure 5B:
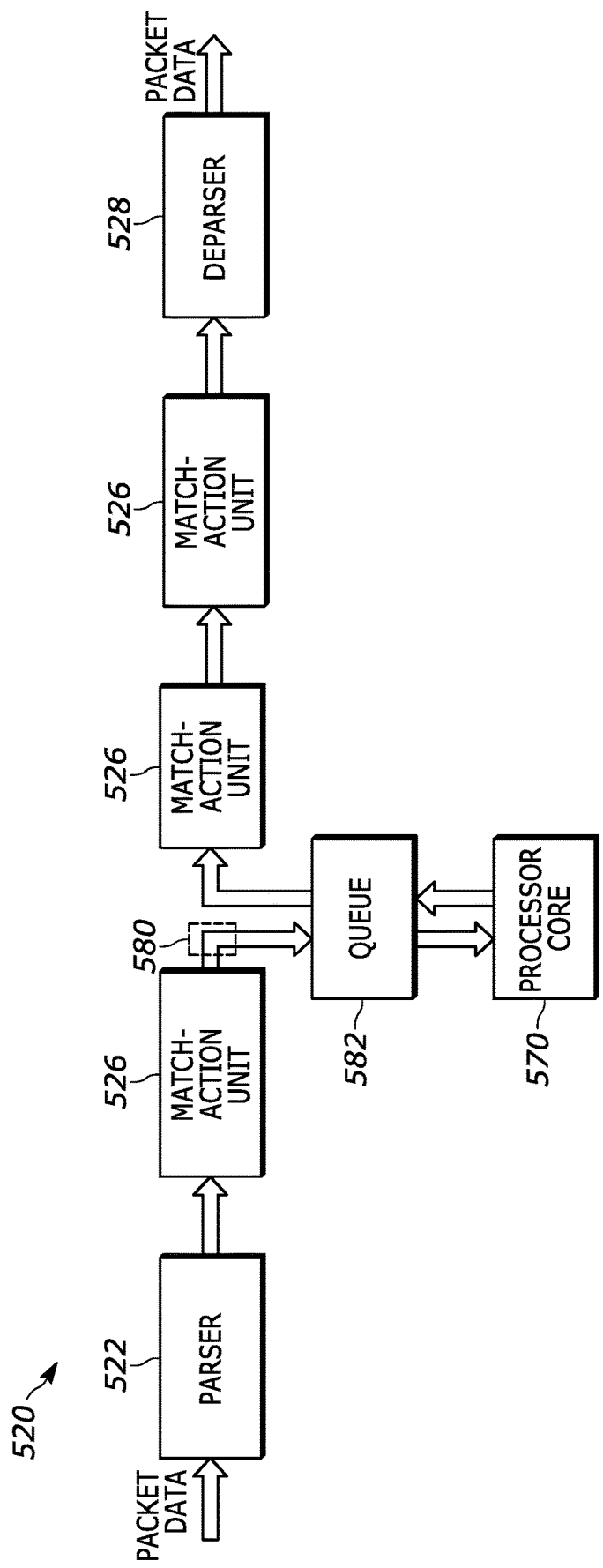
FIG. 5B illustrates the queuing of data corresponding to a packet in a queue before and after out-of-pipeline processing by the processor core.

In the example described with reference to FIG. 5A, the processing of data corresponding to a packet is diverted from the match-action pipeline of the programmable packet processing pipeline 520 to the processor core 570 by the diversion logic 580 for out-of-pipeline processing. In one embodiment, the diversion of processing from the match-action pipeline to the processor core for out-of-pipeline processing involves the queuing of some data corresponding to the packet before and/or after the out-of-pipeline processing. FIG. 5B illustrates the queuing of data corresponding to a packet in a queue 582 before and after out-of-pipeline processing by the processor core 570. In an embodiment, the queuing of data corresponding to a packet involves queuing a PHV, or a portion thereof, before the PHV is processed by the processor core (also referred to as an input queue) and/or queuing an updated PHV, or a portion thereof, that results from the out-of-pipeline processing for return to the match-action pipeline (also referred to as an output queue). In an embodiment, the queue may be implemented in memory such as shared memory, L2 cache memory, and/or L3 cache memory that is available in the I/O system.

FIGS. 5A and 5B depict diversion logic 580 that is configured to implement the diversion of processing from the match-action pipeline of the programmable packet processing pipeline 520 (such as a P4 programmable packet processing pipeline) to the processor core 570 for out-of-pipeline processing. The diversion logic may be embodied in software and/or hardware and in an embodiment, the diversion logic is programmed into hardware circuits at the data plane. In an embodiment, the diversion logic is configured to execute at a specific position in the programmable packet processing pipeline. For example, as illustrated in FIGS. 5A and 5B, the diversion logic is integrated into the programmable packet processing pipeline to execute its functionality between the first match-action unit and the second match-action unit in the match-action pipeline. In an embodiment, diversion logic may be implemented between any two elements in the programmable packet processing pipeline and the position of the diversion logic in the programmable packet processing pipeline is a function of the operation that is to be performed by the out-of-pipeline processing. Additionally, although only a single instance of diversion logic is shown in the examples of FIGS. 5A and 5B, multiple instances of diversion logic may be implemented in a single programmable packet processing pipeline.

Figure 6A:
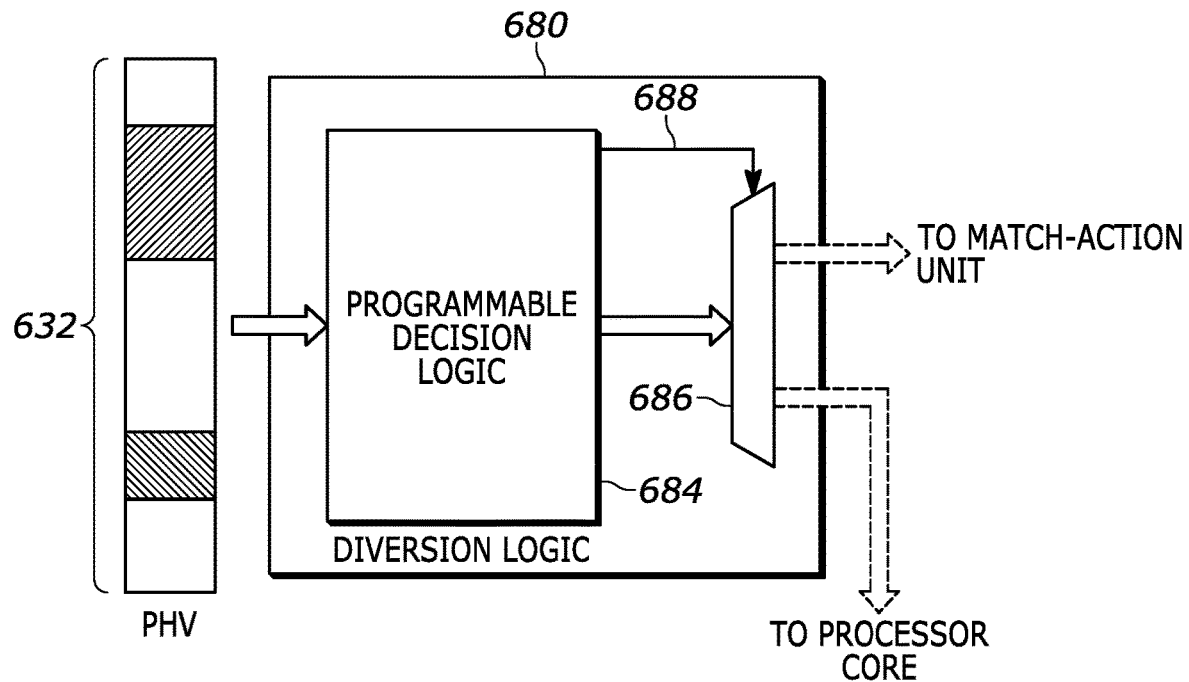
FIG. 6A depicts an expanded view of diversion logic that can be implemented as the diversion logic depicted in FIGS. 5A and 5B.

FIG. 6A depicts an expanded view of diversion logic 680 that can be implemented as the diversion logic 580 depicted in FIGS. 5A and 5B. The diversion logic depicted in FIG. 6A includes programmable decision logic 684 and select logic 686 that is controlled in response to an output from the programmable decision logic. In an embodiment, the diversion logic is programmed into hardware components of an I/O system such as into circuits of an ASIC. In an example operation, the programmable decision logic of the diversion logic reads a field, or fields, of an incoming PHV 632 and determines, based on a value, or values, in the field or fields, whether processing of the PHV should continue on in the match-action pipeline or be diverted to a processor core for out-of-pipeline processing. If it is determined that processing of the PHV should continue on in the match-action pipeline, then a signal 688 generated by the programmable decision logic (e.g., a path select signal) controls the select logic to make the PHV available for the next stage of match-action processing. For example, the select logic queues the PHV, or a portion thereof, for the next match-action unit in the match-action pipeline. On the other hand, if it is determined that processing of the PHV should be diverted from the match-action pipeline to a processor core for out-of-pipeline processing, then a signal generated by the programmable decision logic controls the select logic to make the PHV available to a processor core for out-of-pipeline processing. For example, the select logic of the diversion logic queues the PHV, or a portion thereof, for a processor core. In an embodiment, the out-of-pipeline processing may involve processing the PHV corresponding to the packet, processing the header (or a portion thereof) of the packet, and/or processing the payload of the packet. In an embodiment, the diversion logic is configured to implement a mask and match operation (e.g., a TCAM lookup or a table lookup) on certain bits of the PHV and if a programmed pattern or a dynamic table entry is hit, the processing is diverted to a processor core for out-of-pipeline processing.

Figure 6B:
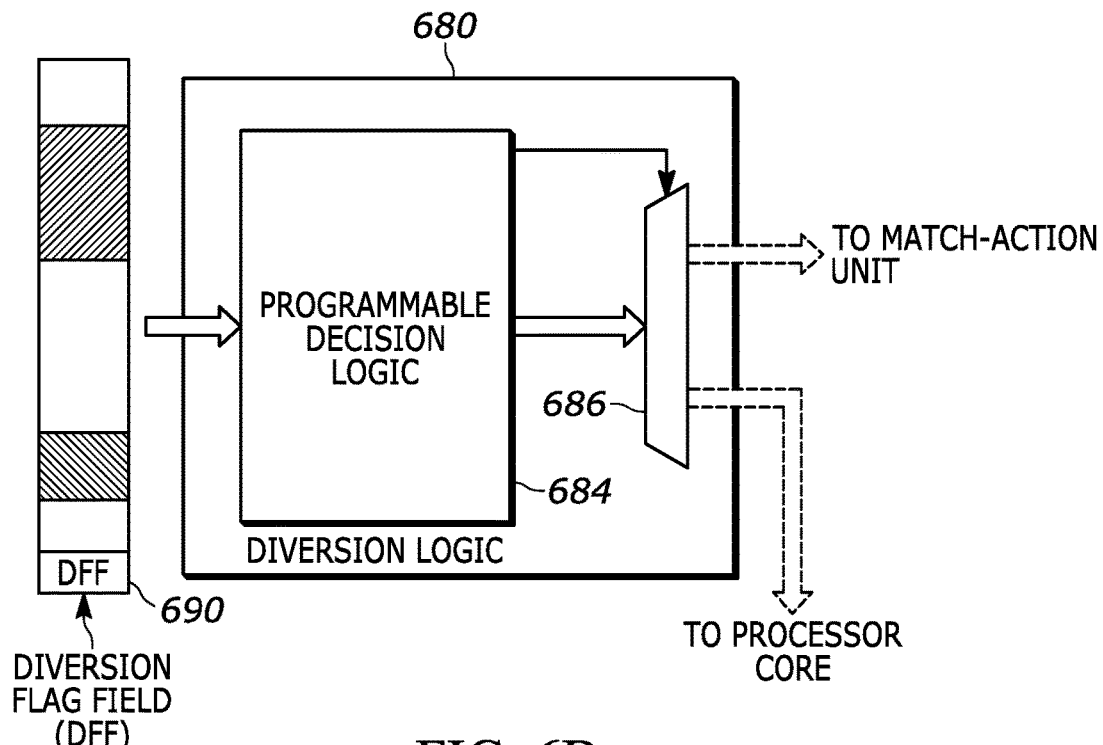
FIG. 6B illustrates a diversion flag field in a PHV that is used by the diversion logic to determine whether the processing of data corresponding to a packet continues on in the match-action pipeline or is diverted to a processor core for out-of-pipeline processing.

In an embodiment, the diversion logic 680 is programmed into a programmable packet processing pipeline of an I/O system to make a diversion decision based on a particular field in the PHV 632. FIG. 6B illustrates a diversion flag field (DFF) 690 in the PHV that is used by the diversion logic to determine whether the processing of data corresponding to a packet (e.g., the PHV) continues on in the match-action pipeline or is diverted to a processor core for out-of-pipeline processing. In an embodiment, the value of the diversion flag field is determined by a previous match-action unit in the match-action pipeline. Thus, whether or not the processing of data corresponding to a packet should be diverted for out-of-pipeline processing may be determined by a value that is generated by a previous match-action unit in the match-action pipeline. In another embodiment, whether or not the processing of data corresponding to a packet should be diverted for out-of-pipeline processing may be determined by a value in the PHV that is populated directly from the parser, e.g., based directly on a value in a header field of the packet. Although the diversion flag field is shown as one contiguous field in the PHV, the diversion flag field may include a combination of fields in the PHV.

Figure 6C:
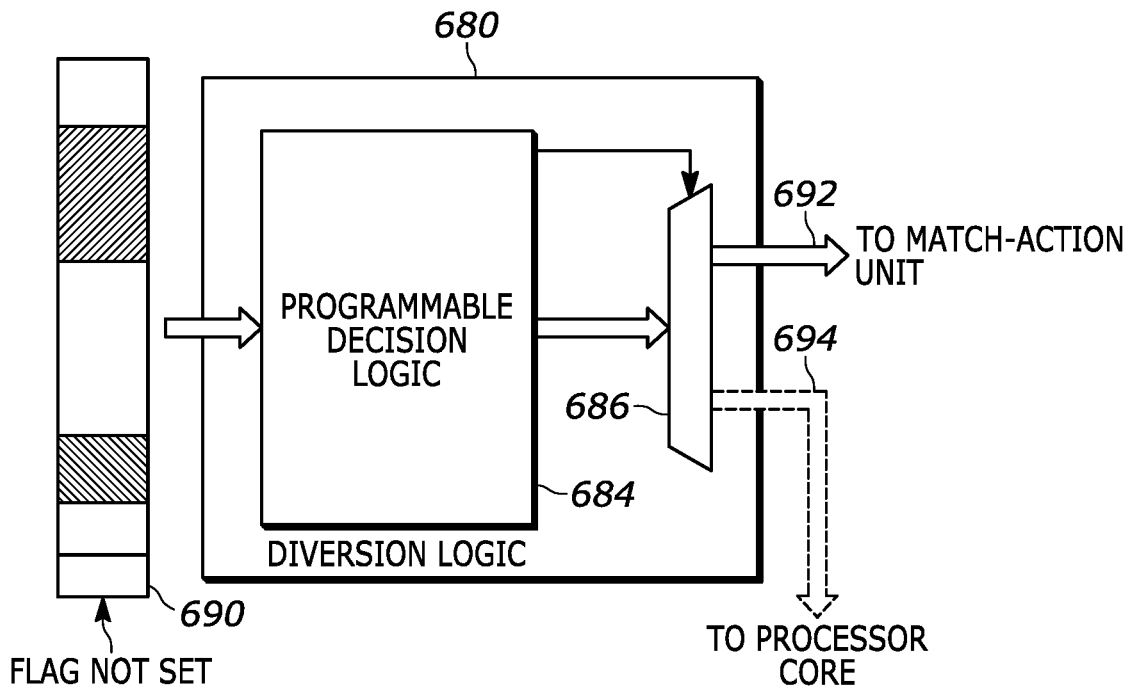
FIG. 6C illustrates a case in which the value in the diversion flag field causes the diversion logic to continue the processing of the PHV corresponding to a packet in the match-action pipeline.

FIG. 6C illustrates a case in which the value in the diversion flag field 690 causes the diversion logic 680 to continue the processing of the PHV 632 corresponding to a packet in the match-action pipeline. Specifically, the solid line arrow 692 indicates that the processing of data corresponding to the packet continues on in the match-action pipeline and the dashed line arrow 694 indicates that processing of data corresponding to the packet is not diverted to a processor core. In an embodiment, continuing to process the PHV corresponding to the packet in the match-action pipeline involves queuing the PHV in a queue that feeds the next match-action unit in the match-action pipeline.

Figure 6D:
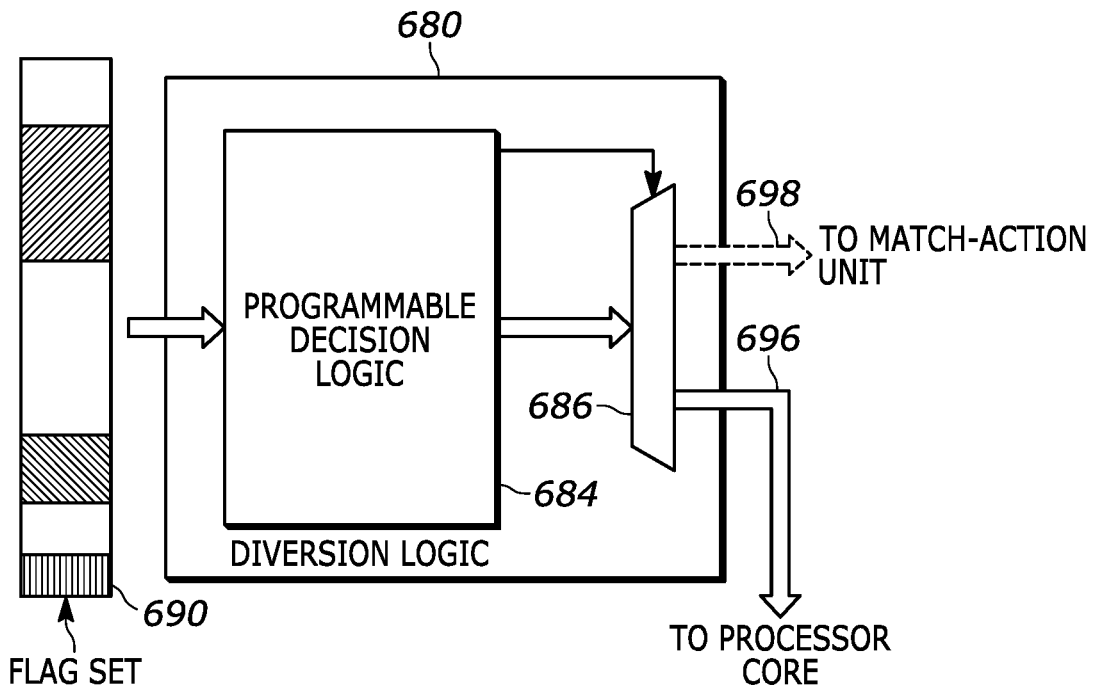
FIG. 6D illustrates a case in which the value in the diversion flag field causes the diversion logic to divert the processing of the PHV corresponding to a packet to a processor core for out-of-pipeline processing.

FIG. 6D illustrates a case in which the value in the diversion flag field 690 causes the diversion logic 680 to divert the processing of the PHV 632 corresponding to a packet to a processor core for out-of-pipeline processing. Specifically, the solid line arrow 696 indicates that the processing of data corresponding to the packet is diverted to a processor core and the dashed line arrow 698 indicates that the processing of data corresponding to the packet does not directly proceed to the next match-action unit, although the processing may return to the next match-action unit in the match-action pipeline after the out-of-pipeline processing. In an embodiment, diverting the processing of data corresponding to a packet to a processor core for out-of-pipeline processing involves queuing the packet's PHV in a queue that is fed directly to the processor core.

In an embodiment, the diversion of processing from the match-action pipeline to a processor core for out-of-pipeline processing also involves providing instructions to the processor core, in which the instructions cause the processor core to execute a particular function. For example, an entry vector, such as a function name or an instruction address, is provided to the processor core for use in fetching an instruction or instructions. In another embodiment, a queue associated with a particular diversion operation is directly connected to a particular set of instructions, such as instructions to execute a TCP establishment operation.

Although an example embodiment of the diversion logic 680 is described with reference to FIGS. 6A-6D, other embodiments of the diversion logic are possible. In an embodiment, the diversion logic is programmed into a programmable packet processing pipeline in conjunction with the P4 programming.

Figure 7:
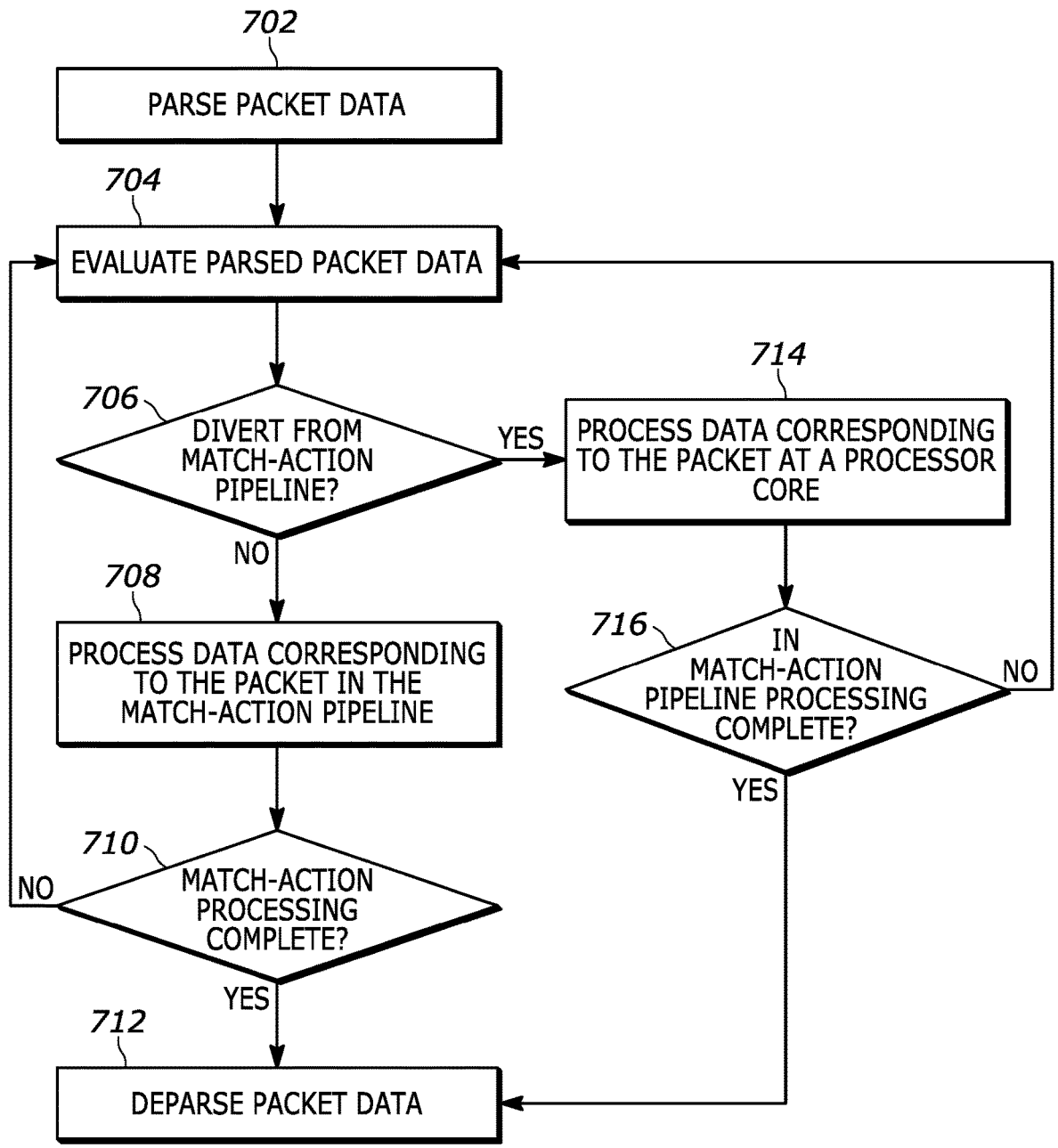
FIG. 7 is a process flow diagram of a method for processing a packet in a programmable packet processing pipeline in which the processing may be diverted from a match-action pipeline of the programmable packet processing pipeline to a processor core for out-of-pipeline processing.

FIG. 7 is a process flow diagram of a method for processing a packet in a programmable packet processing pipeline such as a P4 programmable packet processing pipeline in which the processing may be diverted from a match-action pipeline of the programmable packet processing pipeline to a processor core for out-of-pipeline processing. At block 702, packet data is parsed, e.g., by a parser in the P4 programmable packet processing pipeline. At block 704, the parsed packet data is evaluated, e.g., by diversion logic integrated into the match-action pipeline of the programmable packet processing pipeline. At decision point 706, a decision is made as to whether or not to divert the processing of data corresponding to the packet from the match-action pipeline. If it is determined that processing should not be diverted from the match-action pipeline, then at block 708, data corresponding to the packet continues to be processed in the match-action pipeline, e.g., at the next match-action unit in the match-action pipeline of the P4 programmable packet processing pipeline. At decision point 710, it is determined whether the match-action processing is complete. If the match-action processing is not complete the process returns to block 704. If, however, the match-action processing is complete, then at block 712, the packet data is deparsed, e.g., by a deparser in the P4 programmable packet processing pipeline. Returning to decision point 706, if it is determined that processing of data corresponding to the packet should be diverted from the match-action pipeline, then the process proceeds to block 714. At block 714, data corresponding to the packet is processed by a processor core, such as an ARM processor core. After the out-of-pipeline processing by the processor core is complete, at decision point 716, it is determined if processing in the match-action pipeline is complete. If processing in the match-action pipeline is not complete, then the process returns to block 704 and parsed packet data is evaluated by the next match-action unit in the programmable packet processing pipeline. If, however, processing in the match-action pipeline is complete, then at block 712, packet data is deparsed, e.g., by the deparser in the P4 programmable packet processing pipeline.

In an embodiment, once out-of-pipeline processing of data corresponding to a packet is completed by the processor core, the packet (or data corresponding to the packet) is not returned to the programmable packet processing pipeline. Thus, in some cases, the processing of a packet does not return to the programmable packet processing pipeline after being diverted from the programmable packet processing pipeline and thus does not pass through all of the components of the programmable packet processing pipeline.

As described above, the processing of data corresponding to a packet in a programmable packet processing pipeline can be diverted from a match-action pipeline of the programmable packet processing pipeline to a processor core for out-of-pipeline processing. FIG. 8A depicts elements of an I/O system that are configured to implement a hybrid approach to packet processing at the data plane 804 that includes a programmable packet processing pipeline 820 that is programmable according to a domain-specific language such as P4 and multiple processor cores 870, such as general purpose ARM processor cores. The programmable packet processing pipeline and the multiple processor cores interface with each other via a pipeline-processor interface 874. In an embodiment, the programmable packet processing pipeline includes a parser 822, a match-action pipeline 824 (having a series of match-action units 826), and a deparser 828 as described above with reference to FIGS. 2-7. Elements of the programmable packet processing pipeline may be programmed into physical circuits of the I/O system using P4. In an embodiment, the lookup table of the match unit of each match-action unit may be implemented in memory such as content addressable memory (CAM), including tertiary CAM (TCAM), and the action unit of each match-action unit may be implemented with an instruction fetch circuit, register file circuits, and arithmetic logic unit (ALU) circuits of, for example, an ASIC.

In an embodiment, the processor cores 870 are general purpose processor cores, such as ARM processor cores, Microprocessor without Interlocked Pipeline Stages (MIPS) processor cores, and/or x86 processor cores, as is known in the field. In an embodiment, each processor core includes a memory interface, an ALU, a register bank, an instruction fetch unit, and an instruction decoder, which are configured to execute instructions independently of the other processor cores. In an embodiment, the processor cores are Reduced Instruction Set Computers (RISC) processor cores that are programmable using a general purpose programming language such as C.

In an embodiment, each processor core 870 also includes a bus interface, internal memory, and a memory management unit (MMU) and/or memory protection unit (MPU). For example, the processor cores may include internal cache, e.g., L1 cache and/or L2 cache, and/or may have access to nearby L2 and/or L3 cache. In an embodiment, each processor core includes core-specific L1 cache, including instruction-cache and data-cache and L2 cache that is specific to each processor core or shared amongst a small number of processor cores. L3 cache may also be available to the processor cores.

As shown in FIG. 8A, in an embodiment there are four processor cores 870 (identified as processor cores 1-4) available for out-of-pipeline processing although the number of processor cores available for out-of-pipeline processing is implementation specific. In some embodiments, there may be, for example, 2, 4, 8, 16, or 32 processor cores available for out-of-pipeline processing. Additionally, it should be appreciated that a single I/O system may simultaneously implement multiple different programmable packet processing pipelines. As described above, the processor cores may be used to implement discrete packet processing operations such as L7 applications (e.g., HTTP load balancing, L7 firewalling, and/or L7 telemetry), flow table insertion or table management events, connection setup/management, multicast group join, DPI (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing. Although some operations that may be performed by the processor cores in out-of-pipeline processing are described, other operations may be performed by the processor cores via out-of-pipeline processing.

In an embodiment, the pipeline-processor interface 874 is configured to support the diversion of processing of data corresponding to a packet from the programmable packet processing pipeline 820 (e.g., from the match-action pipeline 824 of a P4 programmable packet processing pipeline) to a processor core 870 for out-of-pipeline processing and the return of data corresponding to the packet back to the programmable packet processing pipeline for further processing once the operations executed by the processor core are complete. The pipeline-processor interface may include memory and/or logic that is configured to manage the transitions between the programmable packet processing pipeline and the processor cores. In an embodiment, the pipeline-processor interface includes memory that is available to queue data that is used by a processor core to implement an operation and also to queue data that results from operations executed by the processor core. In an embodiment, the pipeline-processor interface may include L2 and/or L3 cache. In an embodiment, the pipeline-processor interface utilizes DMA to communicate data corresponding to a packet from the programmable packet processing pipeline directly to a processor core. In some embodiments, the pipeline-processor interface includes shared memory and in other embodiments, the pipeline-processor interface uses a message-based approach to communicating data corresponding to a packet from the programmable packet processing pipeline to the processor cores and from the processor cores to the programmable packet processing pipeline. In some embodiments, the pipeline-processor interface may utilize an interface such as PCIe or cache coherent interconnect for accelerators (CCIX) to service queues to and from a P4 programmable packet processing pipeline.

Examples of diverting processing from the match-action pipeline 824 of the programmable packet processing pipeline 820 are illustrated in FIG. 8B-8D. In particular, FIG. 8B illustrates the processing of data corresponding to a packet being diverted between the first and second match-action units 826 to processor core 2, 870, via the diversion logic 880 and the pipeline-processor interface 874. As illustrated in FIG. 8B, the processing of data corresponding to a packet (e.g., a PHV) that is output from the first match-action unit, is diverted to processor core 2 by the diversion logic for out-of-pipeline processing and some updated data corresponding to the packet (e.g., an updated PHV or some portion thereof) is returned to the match-action pipeline for further processing by the second match-action unit.

In an embodiment, the particular processor core 870 (out of a set of available processor cores) that is used for the out-of-pipeline processing can be determined based on various factors. For example, the selection of a particular processor core for out-of-pipeline processing can be a function of core availability, core workload distribution, core capabilities, previous core workloads, or other factors. In an embodiment, it may be desirable to process packets from the same flow using the same processor core. In some embodiments, a particular processor core may be configured to implement a particular discrete packet processing operation. For example, a certain processor core may be preloaded with a particular instruction set to execute a particular function and/or processor cores may have different circuit configurations, e.g., differences in the amount or type of memory and/or ALU circuits that are better suited for different operations. For example, some processor cores may be configured to efficiently execute encryption operations while other processor cores may be configured for TCP/IP connection setup. The selection of a particular processor core may be implemented within the diversion logic and/or within the pipeline-processor interface. For example, in one embodiment, the diversion logic selects a particular processor core based on a specific preconfigured functionality of the processor core (e.g., the processor core is preloaded with instructions for a particular task) and in another embodiment, the pipeline-processor interface selects a particular processor core based on core availability and/or workload distribution.

FIG. 8C illustrates the processing of data corresponding to a packet being diverted between the first and second match-action units 826 to a different processor core 870, processor core 3, via the diversion logic 880 and the pipeline-processor interface 874. In the example of FIG. 8C, the processing of data corresponding to a packet (e.g., a PHV) that is output from the first match-action unit is diverted to processor core 3 for out-of-pipeline processing and some updated data corresponding to the packet (e.g., an updated PHV or some component thereof) is returned to the match-action pipeline for further processing by the second match-action unit. As illustrated in FIGS. 8B and 8C, the diversion of processing at the same point in the match-action pipeline (e.g., between the first and second match-action units in the match-action pipeline) may involve out-of-pipeline processing by different processor cores. For example, the processing of data corresponding to a first packet through the programmable packet processing pipeline may be diverted to a first processor core (e.g., processor core 2) while the processing of data corresponding to a subsequent packet through the programmable packet processing pipeline may be diverted to a second processor core (e.g., processor core 3), which is different from the first processor core.

FIG. 8D illustrates the processing of data corresponding to a packet being diverted at a different point in the match-action pipeline 824 (e.g., between the second and third match-action units 826 in the match-action pipeline instead of between the first and second match-action units in the match-action pipeline) to a processor core (e.g., processor core 3) via diversion logic 880 and the pipeline-processor interface 874. As illustrated in FIG. 8D, the processing of data corresponding to a packet (e.g., a PHV) that is output from the second match-action unit is diverted to processor core 3 for out-of-pipeline processing and some updated data corresponding to the packet (e.g., an updated PHV or some component thereof) is returned to the match-action pipeline for further processing by the third match-action unit.

Although the examples described above with regard to FIGS. 5A-8D include only a single diversion from the match-action pipeline for out-of-pipeline processing, the processing of data corresponding to a packet may be diverted from the match-action pipeline more than once. Additionally, the out-of-pipeline processing may involve processing by more than one processor core. For example, the processing of data corresponding to a packet may be diverted from the match-action pipeline to a first processor core, which executes a first operation, and then to a second processor core, which executes a second operation, before being returned to the match-action pipeline for further processing. In another embodiment, the processing of data corresponding to a packet may be diverted from the match-action pipeline to multiple different processor cores for parallel out-of-pipeline processing. For example, one processor core may execute a function based on one field of the PHV while another processor core executes a different function on a different field of the PHV in parallel. The outputs of the parallel out-of-pipeline processing may then be returned to the match-action pipeline in the form of an updated PHV that includes data from both processor cores.

In an embodiment, out-of-pipeline processing may involve passing over a particular match-action unit in the match-action pipeline. For example, the processing of data corresponding to a packet may be diverted to a processor core between the first and second match-action units in the series of match-action units as illustrated in FIGS. 8B and 8C but returned to the match-action pipeline for processing by the third match-action unit in the series of match-action units as illustrated in FIG. 8D.

Figure 9:
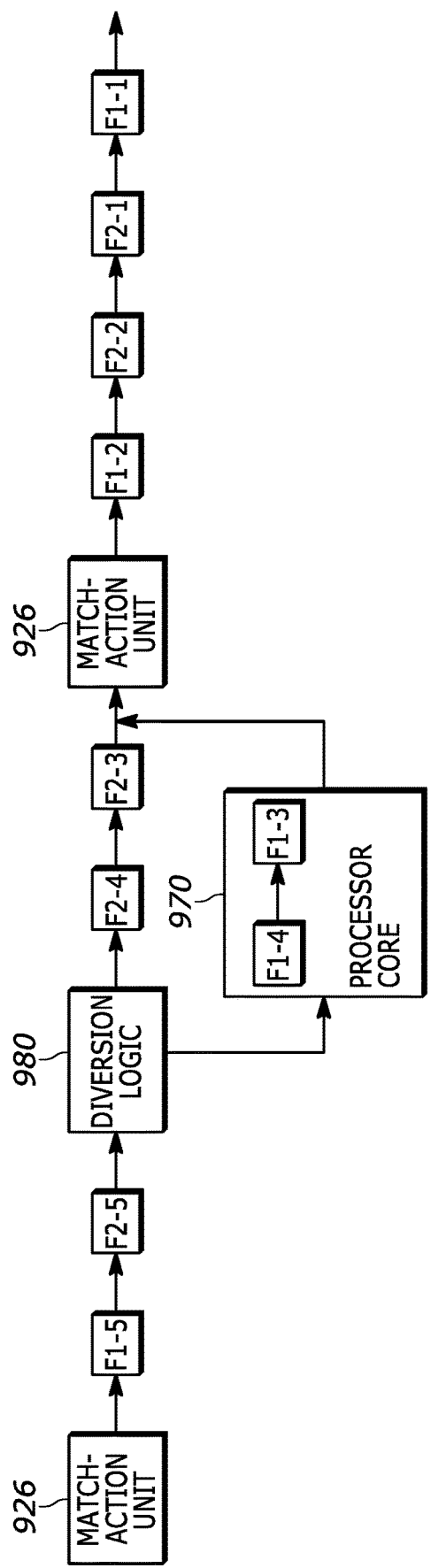
FIG. 9 illustrates an example in which packets from one flow that is being processed in a match-action pipeline are diverted to a processor core and packets from another flow that is being processed in the same match-action pipeline are processed in the match-action pipeline without being diverted to the processor core for out-of-pipeline processing.

When processing packets through an I/O system, it is often times desirable to process the packets in the same order in which the packets are received at the I/O system. If certain packets that are being processed at the data plane in a programmable packet processing pipeline are diverted for out-of-pipeline processing, it is possible that some packets may be processed out of order. That is, the packets may not be processed in the same order (e.g., in time order) in which the packets were received at the I/O system. Thus, in some embodiments, it is desirable to take some action to maintain the order of packet processing the same as the order in which the packets were received at the I/O system even when the received packets are being diverted for out-of-pipeline processing. In one embodiment, packet ordering is maintained in a programmable packet processing pipeline by diverting all packets from a "flow" of packets for out-of-pipeline processing, where a flow of packets is a sequence of packets in which the packets have some common header values such as the same five tuple of a TCP/IP connection, including source IP address, source port number, destination IP address, destination port number, and the protocol. That is, all of the packets of the flow have the same five tuple of source IP address, source port number, destination IP address, destination port number, and protocol. FIG. 9 illustrates an example in which packets from one flow (e.g., flow 1 (F1) that includes packets F1-1-F1-5) that is being processed through match-action units 926 of a match-action pipeline of a programmable packet processing pipeline are diverted to a processor core 970 and packets from another flow (e.g., flow 2 (F2) that includes packets F2-1-F2-5) that is being processed in the same match-action pipeline of the programmable packet processing pipeline are processed in the match-action pipeline without being diverted to the processor core for out-of-pipeline processing. As illustrated in FIG. 9, packets F1-3 and F1-4 from flow 1 have been diverted to the processor core for out-of-pipeline processing while packets F2-3 and F2-4 from flow 2 are not diverted to the processor core but continue to be processed in the match-action pipeline without being diverted to the processor core for out-of-pipeline processing. Both flows are also processed in the match-action units.

Other packet criteria may be used to identify a flow and divert all packets from the same flow to a processor core for out-of-pipeline processing. In an embodiment, packets from a single flow (e.g., packets that have the same source IP address, source port number, destination IP address, destination port number, and protocol) are diverted to the same processor core to maintain the order of the packet processing. In another embodiment, the out-of-pipeline processing of a flow of packets can be distributed amongst multiple different processor cores and packet order can be maintained via queuing, e.g., output queuing that is managed by the pipeline-processor interface. In some embodiments, not all of the packets in a particular flow may need out-of-pipeline processing, but all of the packets are diverted to a processor core simply to maintain the packet order. In another embodiment, packet order can be maintained through queue management within the programmable packet processing pipeline. For example, while only some packets from a flow are diverted for out-of-pipeline processing, packets are queued between match-action stages (e.g., as a packet transitions from one match-action unit in the pipeline to the next match-action unit in the pipeline) and the order of the packets is tracked so that packets are only released to the next match-action unit in the order in which the packets were received at the I/O system.

Figure 10:
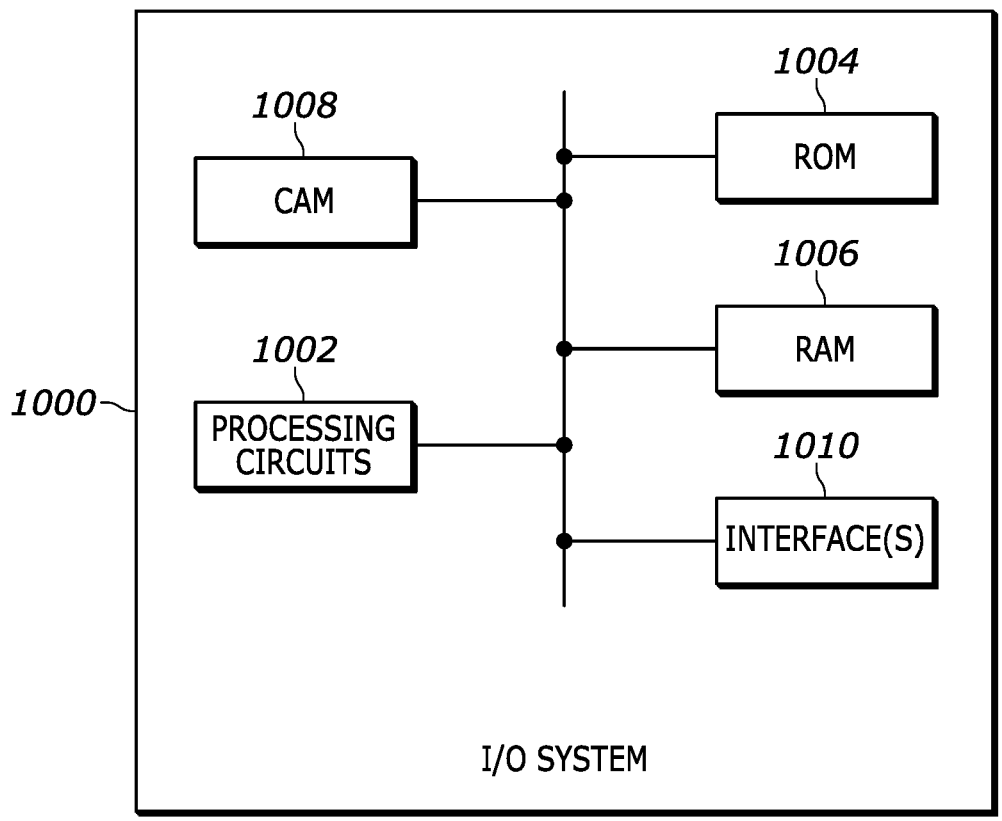
FIG. 10 depicts an example of an I/O system that includes elements that are configured to implement the techniques described herein.

The operations described above are ultimately implemented in an I/O system that includes physical circuits that implement digital data processing, storage, and communications. FIG. 10 depicts an example of an I/O system 1000 that includes elements that are configured to implement the techniques described herein. With reference to FIG. 10, the I/O system includes processing circuits 1002, ROM 1004, RAM 1006, CAM 1008, and at least one interface 1010 (interface(s)). In an embodiment, the processor cores described above are implemented in processing circuits and memory that is integrated into the same integrated circuit (IC) device as ASIC circuits and memory that are used to implement the programmable packet processing pipeline. For example, the processor cores and ASIC circuits are fabricated on the same semiconductor substrate to form a System-on-Chip (SoC). In an embodiment, the I/O system may be embodied as a single IC device (e.g., fabricated on a single substrate) or the I/O system may be embodied as a system that includes multiple IC devices connected by, for example, a printed circuit board (PCB). In an embodiment, the interfaces may include network interfaces (e.g., Ethernet interfaces and/or InfiniB and interfaces) and/or PCI Express (PCIe) interfaces. The interfaces may also include other management and control interfaces such as I2C, general purpose I/Os, USB, UART, SPI, and eMMC.

As used herein the terms "packet" and "frame" may be used interchangeably to refer to a protocol data unit (PDU) that includes a header portion and a payload portion and that is communicated via a network protocol or protocols. In some embodiments, a PDU may be referred to as a "frame" in the context of Layer 2 (the data link layer) and as a "packet" in the context of Layer 3 (the network layer). For reference, according to the P4 specification: a network packet is a formatted unit of data carried by a packet-switched network; a packet header is formatted data at the beginning of a packet in which a given packet may contain a sequence of packet headers representing different network protocols; a packet payload is packet data that follows the packet headers; a packet-processing system is a data-processing system designed for processing network packets, which, in general, implement control plane and data plane algorithms; and a target is a packet-processing system capable of executing a P4 program.

Although the techniques are described herein in terms of processing packetized digital data as is common in digital communications networks, the techniques described herein are also applicable to processing digital data that is not packetized for digital communication using a network protocol. For example, the techniques described herein may be applicable to the encryption of data, redundant array of independent disks (RAID) processing, offload services, local storage operations, and/or segmentation operations. Although the techniques are described herein in terms of the P4 domain-specific language, the techniques may be applicable to other domain-specific languages that utilize a programmable data processing pipeline at the data plane.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for processing packets in a programmable packet processing pipeline, the method comprising:
   processing data corresponding to a packet through a match-action pipeline of a programmable packet processing pipeline that includes a parser, the match-action pipeline, and a deparser, wherein the match-action pipeline includes a series of match-action units and diversion logic located within the match-action pipeline and after a match-action unit in the series of match-action units;
   diverting the processing of data corresponding to the packet from the match-action pipeline to a processor core for out-of-pipeline processing, wherein the processing of data corresponding to the packet is diverted from the match-action pipeline by the diversion logic after processing by a match-action unit in the series of match-action units of the match-action pipeline and before the data reaches the deparser; and
   returning a result of the out-of-pipeline processing back to the programmable packet processing pipeline for further processing in the programmable packet processing pipeline, wherein the result is returned back to the programmable packet processing pipeline at a point in the programmable packet processing pipeline that is after the parser, after the match-action unit in the series of match-action units, and before the deparser.

2. The method of claim 1, wherein returning a result of the out-of-pipeline processing back to the match-action pipeline comprises queuing the result for use by a next stage of the match-action pipeline.

3. The method of claim 1, wherein diverting the processing of data corresponding to the packet from the match-action pipeline to a processor core comprises reading a field in a packet header vector that is processed in the match-action pipeline and diverting the processing of data corresponding to the packet in response to reading the field in the packet header vector.

4. The method of claim 3, wherein diverting the processing of data corresponding to the packet from the match-action pipeline to a processor core comprises queuing at least a portion of the packet header vector for use by the processor core.

5. The method of claim 1, wherein diverting the processing of data corresponding to the packet from the match-action pipeline to a processor core comprises providing a packet header vector to the processor core via direct memory access (DMA).

6. The method of claim 1, further comprising parsing header information corresponding to the packet to generate a packet header vector and providing the packet header vector to the match-action pipeline.

7. The method of claim 1, wherein processing data through a match-action pipeline comprises processing a packet header vector that is generated from header information of the packet.

8. The method of claim 1, wherein the programmable packet processing pipeline is programmable according to the P4 language specification as provided by the P4 Language Consortium.

9. The method of claim 1, further comprising programming the programmable packet processing pipeline according to the P4 language specification as provided by the P4 Language Consortium.

10. The method of claim 1, further comprising diverting the processing of data corresponding to multiple packets from a flow of packets to maintain packet ordering of the flow of packets.

11. The method of claim 10, wherein the multiple packets from the flow of packets are diverted to the same processor core for out-of-pipeline processing.

12. The method of claim 10, wherein a flow of packets is packets that have common header values.

13. The method of claim 10, wherein a flow of packets consists of packets that have the same source IP address, source port number, destination IP address, destination port number, and protocol.

14. A system for processing packets, the system comprising:
   a programmable packet processing pipeline that includes a parser, a match-action pipeline, and a deparser, the match-action pipeline including a series of match-action units;
   multiple processor cores;
   a pipeline-processor interface that connects the programmable packet processing pipeline to the multiple processor cores;
   diversion logic located within the match-action pipeline and after a match-action unit in the series of match-action units and before the deparser and configured to divert the processing of data corresponding to a packet from the match-action pipeline to at least one processor core of the multiple processor cores via the pipeline-processor interface for out-of-pipeline processing, wherein the processing of data corresponding to the packet is diverted by the diversion logic after processing by the match-action unit in the series of match-action units and before deparsing by the deparser; and
   wherein the pipeline-processor interface is configured to return a result of the out-of-pipeline processing back to the programmable packet processing pipeline for further processing in the programmable packet processing pipeline, wherein the result is returned back to the programmable packet processing pipeline at a point in the programmable packet processing pipeline that is after the parser, after the match-action unit in the series of match-action units, and before the deparser.

15. The system of claim 14, wherein the pipeline-processor interface includes memory configured to queue data corresponding to the packet as the processing transitions between the programmable packet processing pipeline and the processor cores.

16. The system of claim 14, wherein the diversion logic is configured to read a value of a packet header vector and to divert the processing from the match-action pipeline to at least one processor core of the multiple processor cores in response to the read value.

17. The system of claim 14, wherein the diversion logic comprises programmable decision logic and select logic, wherein the programmable decision logic is configured to read a value of a packet header vector and to control the select logic to select between available options of a match-action unit of the programmable packet processing pipeline and at least one processor core of the multiple processor cores.

18. The system of claim 14, wherein the programmable packet processing pipeline includes a programmable parser and a programmable deparser, and wherein the match-action pipeline includes a series of programmable match-action units located in a process flow between the programmable parser and the programmable deparser.

19. The system of claim 14, wherein the match-action pipeline includes a series of match-action units and wherein the match-action units of the match-action pipeline include a match unit having key construction logic and a match table.

20. The system of claim 14, wherein the programmable packet processing pipeline is programmable according to the P4 language specification as provided by the P4 Language Consortium.

21. A method for processing data in a programmable data processing pipeline, the method comprising:
processing data corresponding to a data set through a match-action pipeline of a programmable processing pipeline that includes a parser, the match-action pipeline, and a deparser, wherein the match-action pipeline includes a series of match-action units and diversion logic located within the match-action pipeline and after a match-action unit in the series of match-action units;
diverting the processing of data corresponding to the data set from the match-action pipeline to a processor core for out-of-pipeline processing, wherein the processing of data corresponding to the packet is diverted from the match-action pipeline by the diversion logic after processing by a match-action unit in the series of match-action units of the match-action pipeline and before the data reaches the deparser; and
returning a result of the out-of-pipeline processing back to the programmable packet processing pipeline for further processing in the programmable packet processing pipeline, wherein the result is returned back to the programmable packet processing pipeline at a point in the programmable packet processing pipeline that is after the parser, after the match-action unit in the series of match-action units, and before the deparser.

* * * * *